2,773,054
6-ALKYLSULFONYLBENZOTHIAZOLE AZO COMPOUNDS

James M. Straley and David J. Wallace, Kingsport, Tenn., assignors to Eastman Kodak Company, Rochester, N. Y., a corporation of New Jersey No Drawing. Application August 14, 1953, Serial No. 374,414

10 Claims. (Cl. 260—155)

This invention relates to new azo compounds and their application to the art of dyeing or coloring.

We have discovered that the azo compounds having the general formula:

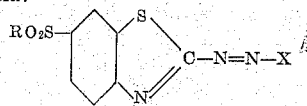

wherein R represents an alkyl group having 1 to 4 carbon atoms and X represents a 1-alkyl-1,2,3,4-tetrahydroquinoline nucleus joined through the carbon atom in its 6-position to the azo bond shown, a 1-hydroxyalkyl-1,2,3,4-tetrahydroquinoline nucleus joined through the carbon atom in its 6-position to the azo bond shown, a 1,2,3,4 - tetrahydrobenzo(h)quinoline nucleus joined through the carbon atom in its 6-position to the azo bond shown, a 1-alkylaminonaphthalene nucleus joined through the carbon atom in its 4-position to the azo bond shown or a 1-hydroxyalkylaminonaphthalene nucleus joined through the carbon atom in its 4-position to the azo bond shown, are valuable dyes for coloring textile materials made of or containing a cellulose alkyl carboxylic acid ester having two to four carbon atoms in the acid groups thereof. They are especially of use for the coloration of cellulose acetate textile materials and, accordingly, their utility as dyes is described more particularly with reference to the dyeing or coloration of cellulose acetate textile materials. When applied to the aforesaid textile materials, they give violet, blue and bluish-green dyeings. The compounds of our invention also color wool, silk, nylon, polyethylene terephthalate and modified polyacrylonitrile textile materials similar colors.

It is an object of our invention to provide new azo compounds. Another object is to provide a satisfactory process for the preparation of our new azo compounds. A further object is to provide dyed textile material, especially cellulose acetate textile materials, which have good fastness to light and gas. Other objects will appear hereinafter.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate propionate and cellulose acetate butyrate.

The new azo compounds of our invention are prepared by diazotizing a 2 - amino-6-alkylsulfonylbenzothiazole having the formula:

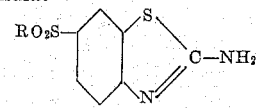

wherein R represents an alkyl group having 1 to 4, inclusive, carbon atoms, and coupling the diazonium compound obtained with a 1-alkyl-1,2,3,4-tetrahydroquinoline, a 1-hydroxyalkyl-1,2,3,4-tetrahydroquinoline, a 1,2,3,4 - tetrahydrobenzo(h)quinoline, a 1 - alkylaminonaphthalene or a 1-hydroxyalkylaminonaphthalene compound.

The 2-amino-6-alkylsulfonylbenzothiazole compounds used in the preparation of the new azo compounds of our invention are advantageously diazotized in relatively strong sulfuric acid or with nitrosyl sulfuric acid in an organic acid such as formic acid, acetic acid or a mixture of acetic and propionic acids, for example. The coupling reaction can be carried out, for example, in organic acids such as those just named or in dilute sulfuric acid. Acid acceptors such as sodium carbonate, sodium acetate, potassium carbonate, potassium acetate and ammonium acetate, for example, may be used to neutralize any excess sulfuric acid present in the reaction mixture after the coupling reaction.

2-amino-6-methylsulfonylbenzothiazole, 2 - amino - 6-ethylsulfonylbenzothiazole, 2 - amino-6-n-propylsulfonylbenzothiazole, 2-amino-6-isopropylsulfonylbenzothiazole, 2-amino-6-n-butylsulfonylbenzothiazole and 2-amino-6-isobutylsulfonylbenzothiazole are illustrative of the 2-amino-6-alkylsulfonylbenzothiazole compounds used in the preparation of the azo compounds of our invention. The use of 2-amino-6-methylsulfonylbenzothiazole is ordinarily preferred.

1-methyl-1,2,3,4-tetrahydroquinoline, 1 - ethyl-1,2,3,4-tetrahydroquinoline, 1-n-butyl - 1,2,3,4-tetrahydroquinoline, 1 - n - butyl-3-hydroxy-7-methyl-1,2,3,4-tetrahydroquinoline, 1 - ethyl-2-methyl-1,2,3,4-tetrahydroquinoline, 1-β-hydroxyethyl-1,2,3,4-tetrahydroquinoline, 1 - β - hydroxypropyl - 1,2,3,4-tetrahydroquinoline, 1-γ-hydroxypropyl - 1,2,3,4-tetrahydroquinoline, 1 - β,γ-dihydroxypropyl - 1,2,3,4 - tetrahydroquinoline, 1-δ-hydroxybutyl-1,2,3,4-tetrahydroquinoline, 1-β-hydroxyethyl - 2 - methyl-7-chloro - 1,2,3,4 - tetrahydroquinoline, 1-β-hydroxyethyl - 2 - methyl-1,2,3,4-tetrahydroquinoline, 1-β,γ-dihydroxypropyl - 7 - methyl-1,2,3,4-tetrahydroquinoline, 1-β,γ-dihydroxypropyl - 2,7 - dimethyl-1,2,3,4-tetrahydroquinoline, 1-β,γ-dihydroxypropyl - 2,4,7-trimethyl-1,2,3,4-tetrahydroquinoline, 1-β,γ-dihydroxypropyl - 5 - acetylamino-8-methoxy - 1,2,3,4-tetrahydroquinoline, 1-β-hydroxypropyl - 2 - methyl-1,2,3,4-tetrahydroquinoline, 1-γ-hydroxypropyl - 2 - methyl-1,2,3,4-tetrahydroquinoline, 1-δ-hydroxybutyl-2-methyl - 1,2,3,4 - tetrahydroquinoline, 1-δ-hydroxybutyl-7-chloro - 1,2,3,4 - tetrahydroquinoline, 1-methylaminonaphthalene, 1-ethylaminonaphthalene, 1-n - propylaminonaphthalene, 1-n-butylaminonaphthalene, 1 - methylamino-5-naphthol, 1-ethylamino-5-acetylaminonaphthalene, 1-ethylamino-5-propionylaminonaphthalene, 1-ethylamino-5-n-butyrylaminonaphthalene, 1 - β,γ-dihydroxypropylaminonaphthalene, 1 - β,γ-dihydroxypropylamino - 5 - acetylaminonaphthalene, 1 - β,γ-dihydroxypropylamino-5-naphthol, 1 - β-ethoxyethylaminonaphthalene, 1-β-hydroxypropylaminonaphthalene, 1-γ-hydroxypropylaminonaphthalene, 1 - δ-hydroxybutylaminonaphthalene, 1 - β,γ-dihydroxypropylamino-2,3-dimethylnaphthalene, 1,2,3,4 - tetrahydrobenzo(h)quinoline-3 - ol and 1,2,3,4-tetrahydrobenzo(h)quinoline-3,7-diol are illustrative of the coupling components used in the preparation of the azo compounds of our invention.

The new azo compounds of our invention give dyeings on textile materials made of or containing a cellulose alkyl carboxylic acid ester having 2 to 4 carbon atoms in the acid groups thereof, especially cellulose acetate textile materials, which have good fastness to light and gas and which discharge well. The dyes yield brilliant dyeings and have excellent dyeing properties. Thus the dyes dye well at low temperatures and give excellent application prints. In addition, the dyeings are fast to sublimation and have good wash fastness.

The following examples illustrate the azo compounds of our invention and their manner of preparation. Parts are expressed as parts by weight.

EXAMPLE 1

57 parts of 2-amino-6-methylsulfonylbenzothiazole were dissolved in 1250 parts of 50% aqueous sulfuric acid at 90° C. The resulting solution was cooled to —10° C. and a solution of 17.5 parts of sodium nitrite dissolved in 125 parts of concentrated sulfuric acid (95%) was added thereto while maintaining the temperature below 0° C. The reaction mixture was stirred while maintaining the temperature at 0° C. to —5° C. until diazotization was complete. The clear brown solution thus obtained was then added with good stirring to a solution of 69 parts of 1-β,γ-dihydroxypropylamino-5-acetylamino-naphthalene in 1250 parts of 10% aqueous sulfuric acid at —5° C. Upon completion of the coupling reaction which took place the reaction mixture was drowned in 6000 parts of cold water, the excess sulfuric acid was neutralized by the addition of sodium acetate and the dye compound which precipitated was recovered by filtration, washed with water and dried at 60° C. 84 parts of a dye having the formula:

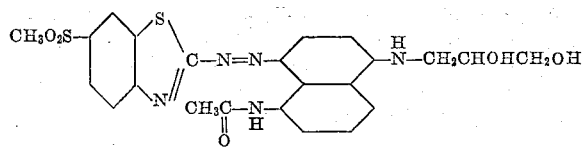

were obtained. It colors cellulose acetate textile materials and nylon, for example, brilliant blue shades.

EXAMPLE 2

A solution of 48 parts of sodium nitrite in 250 parts of concentrated sulfuric acid (95%) was added to 500 parts of acetic-propionic acids (6:1) at a temperature below 5° C. 142 parts of 2-amino-6-methylsulfonylbenzothiazole were added and the resulting solution was diluted with 1700 parts of acetic-propionic acids (6:1) at a temperature below 10° C. Upon completion of the diazotization reaction which took place, the diazonium solution obtained was added with good stirring to a solution of 150 parts of 1-β-hydroxyethyl-2-methyl-7-chloro-1,2,3,4-tetrahydroquinoline in 2000 parts of acetic-propionic acids (6:1) while maintaining the reaction temperature at about 5° C. Upon completion of the coupling reaction which took place, the reaction mixture was made neutral to Congo red paper by the addition of ammonium acetate, held at 5° C. for 1.5 hours and poured into 20 times its volume of cold water. The dye compound which precipitated was recovered by filtration, washed well with water and dried in vacuo at 50° C. 189 parts of a dye compound having the formula:

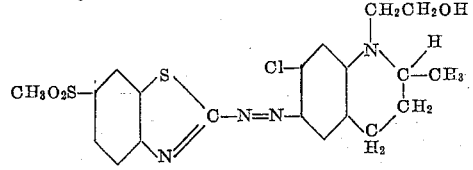

were thus obtained. It colors cellulose acetate textile materials brilliant violet shades.

EXAMPLE 3

57 parts of 2-amino-6-methylsulfonylbenzothiazole were diazotized and the diazonium compound obtained was coupled with 73.5 parts of 1-β,γ-dihydroxypropyl-5-acetylamino-8-methoxy-1,2,3,4-tetrahydroquinoline. Diazotization, coupling and recovery of the dye compound formed were carried out in accordance with the general procedure described in Example 1. The dye compound thus obtained colors cellulose acetate textile materials violet shades.

EXAMPLE 4

57 parts of 2-amino-6-methylsulfonylbenzothiazole were diazotized and the diazonium compound obtained was coupled with 55.3 parts of 1-β,γ-dihydroxypropyl-7-methyl-1,2,3,4-tetrahydroquinoline. Diazotization, coupling and recovery of the dye compound formed were carried out in accordance with the general procedure described in Example 1. The dye compound thus obtained colors cellulose acetate textile materials violet shades.

EXAMPLE 5

57 parts of 2-amino-6-methylsulfonylbenzothiazole were diazotized and the diazonium compound obtained was coupled with 59 parts of 1-β,γ-dihydroxypropyl-2,7-dimethyl-1,2,3,4-tetrahydroquinoline. Diazotization, coupling and recovery of the dye compound formed were carried out in accordance with the general procedure described in Example 1. The dye compound thus obtained colors cellulose acetate textile materials violet shades.

EXAMPLE 6

57 parts of 2-amino-6-methylsulfonylbenzothiazole were diazotized and the diazonium compound obtained was coupled with 62.5 parts of 1-β,γ-dihydroxypropyl-2,4,7-trimethyl-1,2,3,4-tetrahydroquinoline. Diazotization, coupling and recovery of the dye compound formed were carried out in accordance with the general procedure described in Example 1. The dye compound thus obtained colors cellulose acetate textile materials violet shades.

EXAMPLE 7

57 parts of 2-amino-6-methylsulfonylbenzothiazole were diazotized and the diazonium compound obtained was coupled with 61.3 parts of 1-β,γ-dihydroxypropyl-amino-2,3-dimethylnaphthalene. Diazotization, coupling and recovery of the dye compound formed were carried out in accordance with the general procedure described in Example 1. The dye compound thus obtained colors cellulose acetate textile materials violet shades.

EXAMPLE 8

57 parts of 2-amino-6-methylsulfonylbenzothiazole were diazotized and the diazonium compound obtained was coupled with 49.8 parts of 1,2,3,4-tetrahydrobenzo(h)quinoline-3,7-diol. Diazotization, coupling and recovery of the dye compound formed were carried out in accordance with the general procedure described in Example 1. The dye compound thus obtained colors cellulose acetate textile materials blue-green shades.

EXAMPLE 9

57 parts of 2-amino-6-methylsulfonylbenzothiazole were diazotized and the diazonium compound obtained was coupled with 54.8 parts of 1-n-butyl-3-hydroxy-7-methyl-1,2,3,4-tetrahydroquinoline. Diazotization, coupling and recovery of the dye compound formed were carried out in accordance with the general procedure described in Example 1. The dye compound thus obtained colors cellulose acetate textile materials violet shades.

EXAMPLE 10

57 parts of 2-amino-6-methylsulfonylbenzothiazole were diazotized and the diazonium compound obtained was coupled with 53.8 parts of 1,2,3,4-tetrahydrobenzo(h)quinoline-3-ol. Diazotization, coupling and recovery of the dye compound formed were carried out in accordance with the general procedure described in Example 1. The dye compound thus obtained colors cellulose acetate textile materials blue shades.

EXAMPLE 11

60.5 parts of 2-amino-6-ethylsulfonylbenzothiazole were diazotized and the diazonium compound obtained was coupled with 55.3 parts of 1-β,γ-dihydroxypropyl-7-methyl-1,2,3,4-tetrahydroquinoline. Diazotization, coupling and recovery of the dye compound formed were carried out in accordance with the general procedure described in Example 1. The dye compound thus obtained colors cellulose acetate textile materials violet shades.

EXAMPLE 12

64 parts of 2-amino-6-n-propylsulfonylbenzothiazole were diazotized and the diazonium compound obtained was coupled with 44.3 parts of 1-β-hydroxyethyl-1,2,3,4-tetrahydroquinoline. Diazotization, coupling and recovery of the dye compound formed were carried out in accordance with the general procedure described in Example 1. The dye compound thus obtained colors cellulose acetate textile materials violet shades.

EXAMPLE 13

67.5 parts of 2-amino-6-n-butylsulfonylbenzothiazole were diazotized and the diazonium compound obtained was coupled with 51.8 parts of 1-β,γ-dihydroxypropyl-1,2,3,4-tetrahydroquinoline. Diazotization, coupling and recovery of the dye compound formed were carried out in accordance with the general procedure described in Example 1. The dye compound thus obtained colors cellulose acetate textile materials violet shades.

The compounds tabulated hereinafter further illustrate the compounds of our invention. These compounds are prepared by diazotizing the diazo components named hereinafter and coupling the diazonium compounds obtained with the coupling components named hereinafter. The color given is that which the compounds color cellulose acetate textile materials. The diazotization, coupling and recovery operations are carried out in accordance with the procedure described hereinbefore.

Table 1

[Diazo component: 2-amino-6-methylsulfonylbenzothiazole.]

| Coupling Component | Color |
|---|---|
| 1. 1-methyl-1,2,3,4-tetrahydroquinoline | violet. |
| 2. 1-n-butyl-1,2,3,4-tetrahydroquinoline | Do. |
| 3. 1-β-hydroxyethyl-1,2,3,4-tetrahydroquinoline | Do. |
| 4. 1-γ-hydroxypropyl-1,2,3,4-tetrahydroquinoline | Do. |
| 5. 1-δ-hydroxybutyl-1,2,3,4-tetrahydroquinoline | Do. |
| 6. 1-methylaminonaphthalene | Do. |
| 7. 1-ethylaminonaphthalene | Do. |
| 8. 1-methylamino-5-naphthol | blue. |
| 9. 1-β,γ-dihydroxypropylaminonaphthalene | violet. |
| 10. 1-β,γ-dihydroxypropylamino-5-naphthol | blue. |
| 11. 1-δ-hydroxybutylaminonaphthalene | violet. |
| 12. 1-β,γ-dihydroxypropyl-1,2,3,4-tetrahydroquinoline | Do. |

Table 2

[Diazo component: 2-amino-6-ethylsulfonylbenzothiazole.]

| Coupling Component | Color |
|---|---|
| 1. 1-methyl-1,2,3,4-tetrahydroquinoline | violet. |
| 2. 1-n-butyl-1,2,3,4-tetrahydroquinoline | Do. |
| 3. 1-β-hydroxyethyl-1,2,3,4-tetrahydroquinoline | Do. |
| 4. 1-γ-hydroxypropyl-1,2,3,4-tetrahydroquinoline | Do. |
| 5. 1-δ-hydroxybutyl-1,2,3,4-tetrahydroquinoline | Do. |
| 6. 1-methylaminonaphthalene | Do. |
| 7. 1-ethylaminonaphthalene | Do. |
| 8. 1-methylamino-5-naphthol | blue. |
| 9. 1-β,γ-dihydroxypropylaminonaphthalene | violet. |
| 10. 1-β,γ-dihydroxypropylamino-5-naphthol | blue. |
| 11. 1-δ-hydroxybutylaminonaphthalene | violet. |
| 12. 1-β,γ-dihydroxypropyl-1,2,3,4-tetrahydroquinoline | Do. |
| 13. 1,2,3,4-tetrahydrobenzo(h)quinoline-3,7-diol | blue-green. |

Table 3

[Diazo component: 2-amino-6-isopropylsulfonylbenzothiazole.]

| Coupling Component | Color |
|---|---|
| 1. 1-methyl-1,2,3,4-tetrahydroquinoline | violet. |
| 2. 1-n-butyl-1,2,3,4-tetrahydroquinoline | Do. |
| 3. 1-β,hydroxyethyl-1,2,3,4-tetrahydroquinoline | Do. |
| 4. 1-γ-hydroxypropyl-1,2,3,4-tetrahydroquinoline | Do. |
| 5. 1-δ-hydroxybutyl-1,2,3,4-tetrahydroquinoline | Do. |
| 6. 1-methylaminonaphthalene | Do. |
| 7. 1-ethylaminonaphthalene | Do. |
| 8. 1-methylamino-5-naphthol | blue. |
| 9. 1-β,γ-dihydroxypropylaminonaphthalene | violet. |
| 10. 1-β,γ-dihydroxypropylamino-5-naphthol | blue. |
| 11. 1-δ-hydroxybutylaminonaphthalene | violet. |
| 12. 1-β,γ-dihydroxypropyl-1,2,3,4-tetrahydroquinoline | Do. |
| 13. 1,2,3,4-tetrahydrobenzo(h)quinoline-3,7-diol | blue-green. |

Table 4

[Diazo component: 2-amino-6-n-propylsulfonylbenzothiazole.]

| Coupling Component | Color |
|---|---|
| 1. 1-methyl-1,2,3,4-tetrahydroquinoline | violet. |
| 2. 1-n-butyl-1,2,3,4-tetrahydroquinoline | Do. |
| 3. 1-β-hydroxyethyl-1,2,3,4-tetrahydroquinoline | Do. |
| 4. 1-γ-hydroxypropyl-1,2,3,4-tetrahydroquinoline | Do. |
| 5. 1-δ-hydroxybutyl-1,2,3,4-tetrahydroquinoline | Do. |
| 6. 1-methylaminonaphthalene | Do. |
| 7. 1-ethylaminonaphthalene | Do. |
| 8. 1-methylamino-5-naphthol | blue. |
| 9. 1-β,γ-dihydroxypropylaminonaphthalene | violet. |
| 10. 1-β,γ-dihydroxypropylamino-5-naphthol | blue. |
| 11. 1-δ-hydroxybutylaminonaphthalene | violet. |
| 12. 1-β,γ-dihydroxypropyl-1,2,3,4-tetrahydroquinoline | Do. |
| 13. 1,2,3,4-tetrahydrobenzo(h)quinoline-3,7-diol | blue-green. |

Table 5

[Diazo component: 2-amino-6-isobutylsulfonylbenzothiazole.]

| Coupling Component | Color |
|---|---|
| 1. 1-methyl-1,2,3,4-tetrahydroquinoline | violet. |
| 2. 1-n-butyl-1,2,3,4-tetrahydroquinoline | Do. |
| 3. 1-β,hydroxyethyl-1,2,3,4-tetrahydroquinoline | Do. |
| 4. 1-γ-hydroxypropyl-1,2,3,4-tetrahydroquinoline | Do. |
| 5. 1-δ-hydroxybutyl-1,2,3,4-tetrahydroquinoline | Do. |
| 6. 1-methylaminonaphthalene | Do. |
| 7. 1-ethylaminonaphthalene | Do. |
| 8. 1-methylamino-5-naphthol | blue. |
| 9. 1-β,γ-dihydroxypropylaminonaphthalene | violet. |
| 10. 1-β,γ-dihydroxypropylamino-5-naphthol | blue. |
| 11. 1-δ-hydroxybutylaminonaphthalene | violet. |
| 12. 1-β,γ-dihydroxypropyl-1,2,3,4-tetrahydroquinoline | Do. |
| 13. 1,2,3,4-tetrahydrobenzo(h)quinoline-3,7-diol | blue-green. |

Table 6

[Diazo component: 2-amino-6-n-butylsulfonylbenzothiazole.]

| Coupling Component | Color |
|---|---|
| 1. 1-methyl-1,2,3,4-tetrahydroquinoline | violet. |
| 2. 1-n-butyl-1,2,3,4-tetrahydroquinoline | Do. |
| 3. 1-β-hydroxyethyl-1,2,3,4-tetrahydroquinoline | Do. |
| 4. 1-γ-hydroxypropyl-1,2,3,4-tetrahydroquinoline | Do. |
| 5. 1-δ-hydroxybutyl-1,2,3,4-tetrahydroquinoline | Do. |
| 6. 1-methylaminonaphthalene | Do. |
| 7. 1-ethylaminonaphthalene | Do. |
| 8. 1-methylamino-5-naphthol | blue. |
| 9. 1-β,γ-dihydroxypropylaminonaphthalene | violet. |
| 10. 1-β,γ-dihydroxypropylamino-5-naphthol | blue. |
| 11. 1-δ-hydroxybutylaminonaphthalene | violet. |
| 12. 1-β,γ-dihydroxypropyl-1,2,3,4-tetrahydroquinoline | Do. |
| 13. 1,2,3,4-tetrahydrobenzo(h)quinoline-3,7-diol | blue-green. |

In order that the preparation of the azo compounds of our invention may be entirely clear, the preparation of certain intermediates used in their manufacture is described hereinafter.

*Preparation of 2-amino-6-methylsulfonylbenzothiazole*

A solution of 200 parts of bromine in 300 parts of acetic acid was added over the course of about 1 hour to a mixture of 171 parts of p-aminophenylmethylsulfone and 202 parts of sodium thiocyanate in 1750 parts of acetic acid. The temperature was held below 35° C. during the addition and after complete addition of the bromine-acetic acid mixture, the reaction mixture was stirred for 18 hours. The reaction product was recovered on the filter by filtration, washed with acetic acid and then dispersed in 6000 parts of water. The reaction mixture thus obtained was heated to boiling and then an alkali such as caustic soda or sodium carbonate was added until the pH of the reaction mixture was about 6. The reaction mixture was then cooled, filtered and the reaction product which collected on the filter was washed well with water and dried at 120° C. 145 to 160 parts of 2-amino-6-methylsulfonylbenzothiazole were obtained as light yellow crystals melting at 226° C.–228° C.

*Preparation of 2-acetylamino-6-thiocyanobenzothiazole*

To a solution of 18.6 parts of aniline and 30.4 parts of ammonium thiocyanate in 300 parts of acetic acid at 15° C. 14.2 parts of chlorine were bubbled in at 15° C.–17°

C. 30 minutes after addition of the chlorine 15.6 parts of sodium acetate and 30.4 parts of ammonium thiocyanate were added to the reaction mixture. While holding the temperature of the reaction mixture below 35° C., 14.2 parts of chlorine were passed in and the reaction mixture was stirred overnight at room temperature. The solid present in the reaction mixture was recovered by filtration, washed with 50 parts of acetic acid and then suspended in 600 parts of water. The mixture thus obtained was heated to boiling and filtered. 30 parts of sodium acetate were added to the filtrate and the solid which precipitated was collected at 70° C. on a filter, washed with 200 parts of cold water and dried at 100° C. 30 parts of a product melting at 187° C.–188° C. were thus obtained.

30 parts of acetic anhydride were added at 80° C. to a solution of 52.6 parts of the above product in 81 parts of acetic acid, and the temperature of the reaction mixture was held at 80° C.–90° C. for one hour. The reaction mixture was then poured into 1000 parts of cold water and the product which precipitated was recovered by filtration, washed with 500 parts of water and then dried at 60° C. 62 parts of 2-acetylamino-6-thiocyanobenzothiazole melting at 247° C.–249° C. were thus obtained.

*Preparation of 2-amino-6-ethylsulfonylbenzothiazole*

A solution of 26.4 parts of crystalline sodium sulfide and 24.9 parts of 2-acetylamino-6-thiocyanobenzothiazole in 150 parts of ethyl alcohol were refluxed together for 10 minutes and after cooling the reaction mixture to 20° C., 16.3 parts of ethyl iodide were added at one time and the reaction mixture resulting was refluxed for one hour. The reaction mixture was then poured into 1000 parts of water and the product which precipitated was recovered by filtration, washed well with water and dried at 60° C. 23.6 parts of 2-acetylamino-6-ethylthiobenzothiazole melting at 168° C.–169° C. were obtained. If desired, the quality of the product can be checked by hydrolyzing a little of the product with acid to 2-amino-6-ethylthiobenzothiazole melting at 137° C.–139° C.

19 parts of 30% aqueous hydrogen peroxide were added to a solution of 15.5 parts of 2-acetylamino-6-ethylthiobenzothiazole in 53 parts of acetic acid while maintaining the temperature of the reaction mixture between 80° C.–90° C. The reaction mixture was maintained at this temperature for one hour and then poured into 500 parts of cold water. The solid present in the reaction mixture was recovered by filtration and then suspended in a mixture of 800 parts of water and 100 parts of concentrated hydrochloric acid. The reaction mixture thus obtained was heated to boiling and then filtered. The filtrate was neutralized with sodium acetate, cooled to 25° C. and filtered. The product collected on the filter was washed with cold water and dried at 60° C. 8.5 parts of 2-amino-6-ethylsulfonylbenzothiazole melting at 173° C.–175° C. were thus obtained.

*Preparation of 2-amino-6-isopropylsulfonylbenzothiazole*

This compound was prepared in accordance with the procedure described for the preparation of 2-amino-6-ethylsulfonylbenzothiazole using 17.76 parts of isopropyl iodide in place of ethyl iodide. The melting point of the 2-acetylamino-6-isopropylthiobenzothiazole formed during the process was 174° C.–175° C. while that of the final product 2-amino-6-isopropylsulfonylbenzothiazole was 207° C.–209° C.

2-amino-6-n-propylsulfonylbenzothiazole is similarly prepared by the use of 17.76 parts of n-propyl iodide in place of isopropyl iodide in the foregoing example.

*Preparation of 2-amino-6-isobutylsulfonylbenzothiazole*

This compound was prepared in accordance with the procedure described for the preparation of 2-amino-6-ethylsulfonylbenzothiazole using 14.3 parts of isobutyl bromide in place of ethyl iodide. The melting point of the 2-acetylamino-6-isobutylthiobenzothiazole obtained was 167° C.–168° C. while that of the final product 2-amino-6-isobutylsulfonylbenzothiazole was 206° C.–207° C.

2-amino-6-n-butylsulfonylbenzothiazole is similarly prepared by using 14.3 parts of n-butyl bromide in place of isobutyl bromide in the foregoing example.

The azo dye compounds of our invention can be applied to the textile materials named hereinbefore in the form of an aqueous dispersion and are ordinarily so applied. To illustrate, the dye compound is finely ground with a dispersing agent such as sodium lignin sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

Widely varying amounts of dye can be used in the dyeing operation. The amount of dye used can be, for example, ⅓ to 3% (by weight) of that of the textile material although lesser or greater amounts of dye can be employed.

The expression "acetic-propionic acids (6:1)" refers to a mixture of acetic and propionic acids in which there are 6 parts by volume of acetic acid to 1 part by volume of propionic acid.

We claim:

1. The azo compounds having the formula:

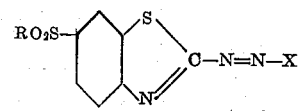

wherein R represents an alkyl group having 1 to 4 carbon atoms and X represents a member selected from the group consisting of a 1 - alkyl - 1,2,3,4 - tetrahydroquinoline nucleus joined through the carbon atom in its 6-position to the azo bond shown, a 1-hydroxyalkyl-1,2,3,4-tetrahydroquinoline nucleus joined through the carbon atom in its 6-position to the azo bond shown, a 1,2,3,4 - tetrahydrobenzo(h)quinoline nucleus joined through the carbon atom in its 6-position to the azo bond shown, a 1 - alkylaminonaphthalene nucleus joined through the carbon atom in its 4-position to the azo bond shown and a 1-hydroxyalkylaminonaphthalene nucleus joined through the carbon atom in its 4-position to the azo bond shown.

2. The azo compounds having the formula:

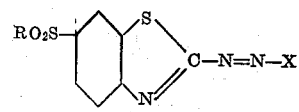

wherein R represents an alkyl group having 1 to 4 carbon atoms and X represents a 1-alkyl-1,2,3,4-tetrahydroquinoline nucleus joined through the carbon atom in its 6-position to the azo bond shown.

3. The azo compounds having the formula:

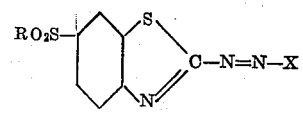

wherein R represents an alkyl group having 1 to 4 carbon atoms and X represents a 1-hydroxyalkyl-1,2,3,4-tetrahydroquinoline nucleus joined through the carbon atom in its 6-position to the azo bond shown.

4. The azo compounds having the formula:

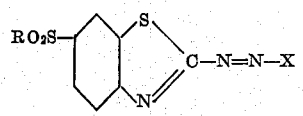

wherein R represents an alkyl group having 1 to 4 carbon atoms and X represents a 1,2,3,4-tetrahydrobenzo(h)quinoline nucleus joined through the carbon atom in its 6-position to the azo bond shown.

5. The azo compounds having the formula:

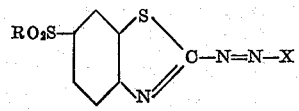

wherein R represents an alkyl group having 1 to 4 carbon atoms and X represents a 1-hydroxyalkylaminonaphthalene nucleus joined through the carbon atom in its 4-position to the azo bond shown.

6. The azo compounds having the formula:

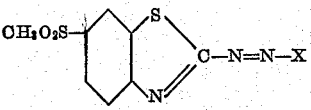

wherein X represents a member selected from the group consisting of a 1-alkyl-1,2,3,4-tetrahydroquinoline nucleus joined through the carbon atom in its 6-position to the azo bond shown, a 1-hydroxyalkyl-1,2,3,4-tetrahydroquinoline nucleus joined through the carbon atom in its 6-position to the azo bond shown, a 1,2,3,4-tetrahydrobenzo(h)quinoline nucleus joined through the carbon atom in its 6-position to the azo bond shown, a 1-alkylaminonaphthalene nucleus joined through the carbon atom in its 4-position to the azo bond shown and a 1-hydroxyalkylaminonaphthalene nucleus joined through the carbon atom in its 4-position to the azo bond shown.

7. The azo compounds having the formula:

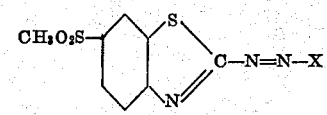

wherein X represents a 1-hydroxyalkyl-1,2,3,4-tetrahydroquinoline nucleus joined through the carbon atom in its 6-position to the azo bond shown.

8. The azo compound having the formula:

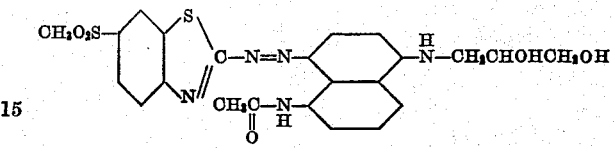

9. The azo compound having the formula:

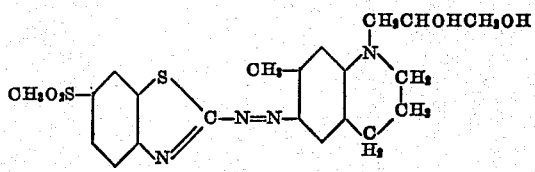

10. The azo compound having the formula:

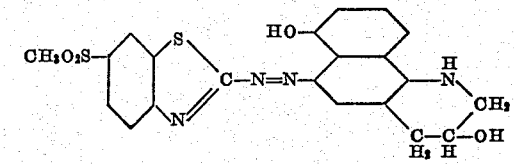

References Cited in the file of this patent
UNITED STATES PATENTS

| | | |
|---|---|---|
| 2,149,051 | Helberger et al. | Feb. 28, 1939 |
| 2,323,315 | Dickey et al. | July 6, 1943 |